US011199394B2

(12) United States Patent
Yu et al.

(10) Patent No.: US 11,199,394 B2
(45) Date of Patent: Dec. 14, 2021

(54) APPARATUS FOR THREE-DIMENSIONAL SHAPE MEASUREMENT

(71) Applicant: BENANO INC., Taipei (TW)

(72) Inventors: Liang-Pin Yu, Taipei (TW); Yeong-Feng Wang, Taipei (TW); Chun-Di Chen, Taipei (TW)

(73) Assignee: BENANO INC., Taipei (TW)

( * ) Notice: Subject to any disclaimer, the term of this patent is extended or adjusted under 35 U.S.C. 154(b) by 0 days.

(21) Appl. No.: 16/948,647

(22) Filed: Sep. 25, 2020

(65) Prior Publication Data
US 2021/0123723 A1    Apr. 29, 2021

(30) Foreign Application Priority Data

Oct. 29, 2019  (TW) .................. 108139137

(51) Int. Cl.
*G01B 11/24* (2006.01)
*G01B 11/25* (2006.01)
*G01B 11/00* (2006.01)

(52) U.S. Cl.
CPC ............ *G01B 11/24* (2013.01); *G01B 11/002* (2013.01); *G01B 11/25* (2013.01);
(Continued)

(58) Field of Classification Search
CPC ....... G01B 11/002; G01B 11/24; G01B 11/25; G01B 11/2504; G01B 11/2509; G01B 11/2513; G01B 11/2518; G01B 11/2522; G01B 11/2527; G01B 11/2531; G01B 11/2536; G01B 11/254; G01B 11/2545; G06T 7/50; G06T 7/521; G06T 7/55; G06T 7/557; G06T 7/564; G06T 7/586; G06T 7/593; G06T 7/596; G06T 2207/10028; G06T 2207/10141; G06T 2207/10152

See application file for complete search history.

(56) References Cited

U.S. PATENT DOCUMENTS 7,440,590 B1 * 10/2008 Hassebrook ....... G01B 11/2513
345/582
9,131,223 B1 * 9/2015 Rangarajan .......... H04N 13/254
(Continued)

FOREIGN PATENT DOCUMENTS

TW        I396823 B       5/2013

*Primary Examiner* — Gordon J Stock, Jr.
(74) *Attorney, Agent, or Firm* — Innovation Capital Law Group, LLP; Vic Lin

(57) ABSTRACT

An apparatus for three-dimensional shape measurement is provided, including a projection device, an image capture device, and an image processing device. The projection device sequentially projects a plurality of structured light beams on a scene during a first projection period and a second projection period. The mean level of the structured light beams during the first projection period is the same as the mean level of the structured light beams during the second projection period, and the frequency of the structured light beams during the first projection period is different from the frequency of the structured light beams during the second projection period. The image capture device captures an image of the scene within the projection time of each of the structured light beams. The image processing device obtains a three-dimensional shape of a to-be-measured object in the scene according to the images.

10 Claims, 4 Drawing Sheets

(52) U.S. Cl.
CPC ...... *G01B 11/2513* (2013.01); *G01B 11/2527* (2013.01); *G01B 11/2536* (2013.01)

(56) References Cited

U.S. PATENT DOCUMENTS

| | | | |
|---|---|---|---|
| 9,562,857 B2* | 2/2017 | Debevec | G01N 21/55 |
| 2010/0008588 A1* | 1/2010 | Feldkhun | G01B 11/2527 |
| | | | 382/206 |
| 2015/0176982 A1* | 6/2015 | Gupta | G01B 11/254 |
| | | | 348/136 |
| 2017/0134680 A1* | 5/2017 | Zhong | G06T 1/0007 |
| 2019/0101382 A1* | 4/2019 | Taubin | G06F 17/17 |
| 2020/0056882 A1* | 2/2020 | Yu | G01B 11/2536 |

* cited by examiner

APPARATUS FOR THREE-DIMENSIONAL SHAPE MEASUREMENT

CROSS-REFERENCE TO RELATED APPLICATION

This non-provisional application claims priority under 35 U.S.C. § 119(a) to patent application Ser. No. 10/813,9137 in Taiwan, R.O.C. on Oct. 29, 2019, the entire contents of which are hereby incorporated by reference.

BACKGROUND

Technical Field

The present invention relates to a measurement technology, and in particular, to an apparatus for three-dimensional shape measurement.

Related Art

An application range of non-contact optical detection is becoming increasingly more extensive, especially for requirements of three-dimensional measurement. Non-contact three-dimensional detection has developed a variety of technologies, where a phase shift method is a three-dimensional detection technology with relatively better accuracy and speed.

However, according to the conventional three-dimensional measurement phase shift method, it is necessary to capture a plurality of images to complete three-dimensional modeling, and the number of captured images will have a direct effect on the measurement speed.

In addition, when a depth of a measured object changes greatly and cannot be represented by only a single frequency, a plurality of frequencies will be required to complete the three-dimensional detection. However, a higher signal frequency leads to a greater influence of thermal effects in the system, and due to limitation of characteristics of the modulation transfer function (MTF) of the lens, an amplitude of the actually captured image will vary with the frequency and cannot be compensated through an original image.

SUMMARY

In view of the above problems, the invention provides an apparatus for three-dimensional shape measurement, including: a projection device, an image capture device, and an image processing device. The projection device sequentially projects a plurality of structured light beams on a scene during a first projection period and a second projection period. Each of the structured light beams is projected during a separate period of time and has a frequency and a mean level. The mean level of the structured light beams during the first projection period is the same as the mean level of the structured light beams during the second projection period, and the frequency of the structured light beams during the first projection period is different from the frequency of the structured light beams during the second projection period. After operating for a specified period of time, a system gradually reaches thermal equilibrium and enters a steady state, which has little effect on a high-frequency signal. The image capture device captures an image of the scene within the projection time of each of the structured light beams; and the image processing device obtains a three-dimensional shape of a to-be-measured object in the scene according to the images.

Therefore, in some embodiments, the apparatus for three-dimensional shape measurement in the present invention uses structured light beams of different frequencies to obtain the three-dimensional shape of the to-be-measured object through the image processing device. The structured light beams of different frequencies have the same mean level to reduce a number of captured images. An optical system has steps of energy input/output and needs to overcome the heat derivation problem. Therefore, by first projecting a low-frequency signal that is less affected by heat, and after the system gradually reaches thermal equilibrium and enters a steady state, a high-frequency signal or a signal with related mean levels is projected, thereby preventing the high-frequency signal from the influence of the system heat derivation. In addition, by using a plurality of frequencies to increase the measurement range, resolution, and accuracy, the multi-value problem caused by a single frequency is reduced. Furthermore, a mean level image with uniform light intensity is directly projected, and then a plurality of structured light beams with different frequencies are matched.

DETAILED DESCRIPTION

According to some embodiments, an apparatus for three-dimensional shape measurement may use any suitable projection device to project structured light beams onto a scene, and the scene may include one or more to-be-measured objects. Any suitable image capture device may be used to capture the structured light beam reflected from the scene as an image and store the image in the image capture device. The structured light beam projected by the projection device may be any suitable structured light beam, for example, but not limited to, the sinusoidal periodic structured light beam. According to some embodiments, a structured light beam with a high enough frequency may be selected, so that the stored image can maintain a constant global illumination and defocusing effect. Then, a position of the object point on a surface of the to-be-measured object in the scene is calculated, by using a triangle geometric method, an object point of the structured light beam projected by the projection device, and the object point of the image stored by the corresponding image capture device, to complete the three-dimensional shape measurement.

Figure 1:
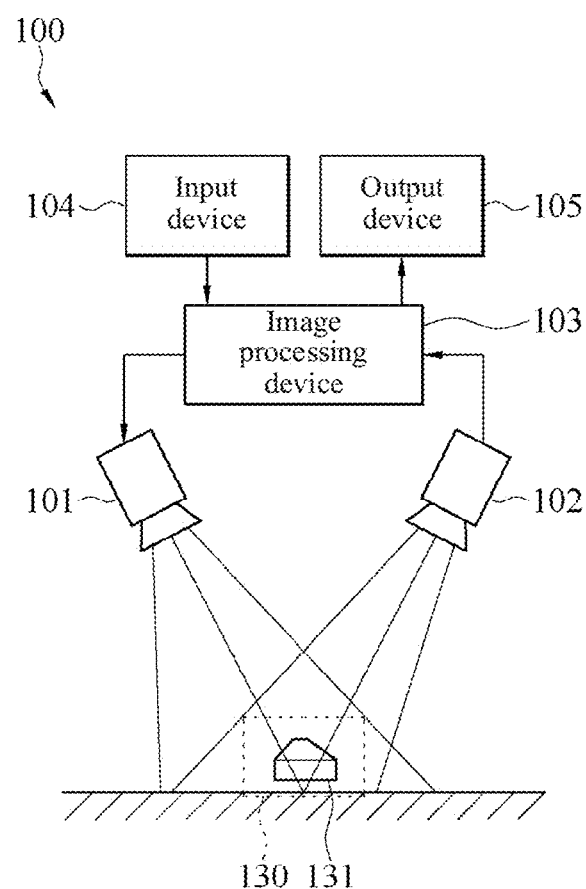
FIG. 1 is a schematic diagram of an embodiment of an apparatus for three-dimensional shape measurement according to the present invention.

Referring to FIG. 1, FIG. 1 is a schematic diagram of an embodiment of an apparatus 100 for three-dimensional shape measurement according to the present invention. The apparatus 100 for three-dimensional shape measurement includes: a projection device 101, an image capture device 102, one or more input devices 104, one or more output devices 105, and an image processing device 103. The image processing device 103 is connected to the projection device 101 and the image capture device 102. The input devices 104 and the output devices 105 are connected to the image processing device 103.

The image processing device 103 may cause the projection device 101 to project any number of structured light beams onto a scene 130 during a separate period of time, and the scene 130 may include one or more of any to-be-measured object 131. In addition, the image capture device 102 may capture a structured light beam reflected from the scene 130, store the structured light beam as an image, and provide the image to the image processing device 103. The image processing device 103 then obtains a three-dimensional shape of the to-be-measured object 131 according to the processing method described later and related data of the to-be-measured object 131 in the scene 130.

According to some embodiments, the image processing device 103 is configured to: control operation of the projection device 101 and the image capture device 102, perform calculation described later in the specification, generate any suitable output, and perform any other suitable function in some embodiments, which will be further described in the following. The image processing device 103 may be any suitable processing device, for example, but not limited to: a computer, other devices with functions such as calculation, storage, receiving, output, and control, or the like.

According to some embodiments, the projection device 101 may be any suitable device configured to project structured light beams, for example, but not limited to a projection system, a grating projector, other structured light beam sources, or the like.

According to some embodiments, the image capture device 102 may be any device configured to capture and store an image, for example, but not limited to a camera, an optical sensor, an image sensor, a digital camera, a three-line photosensitive coupling camera, and the like.

According to some embodiments, the input device 104 may be one or more input devices configured to control the image processing device 103, for example, but not limited to a touch screen, a mouse, one or more buttons, a keyboard, a voice recognition circuit, and the like.

According to some embodiments, the output device 105 may be a device configured to provide a signal output from the image processing device 103, for example, but not limited to a display, a storage device, and the like.

According to some embodiments, any other suitable device may be added to the apparatus 100 for three-dimensional shape measurement. In some embodiments, elements in the apparatus 100 for three-dimensional shape measurement shown in FIG. 1 may be combined or omitted.

Figure 2:
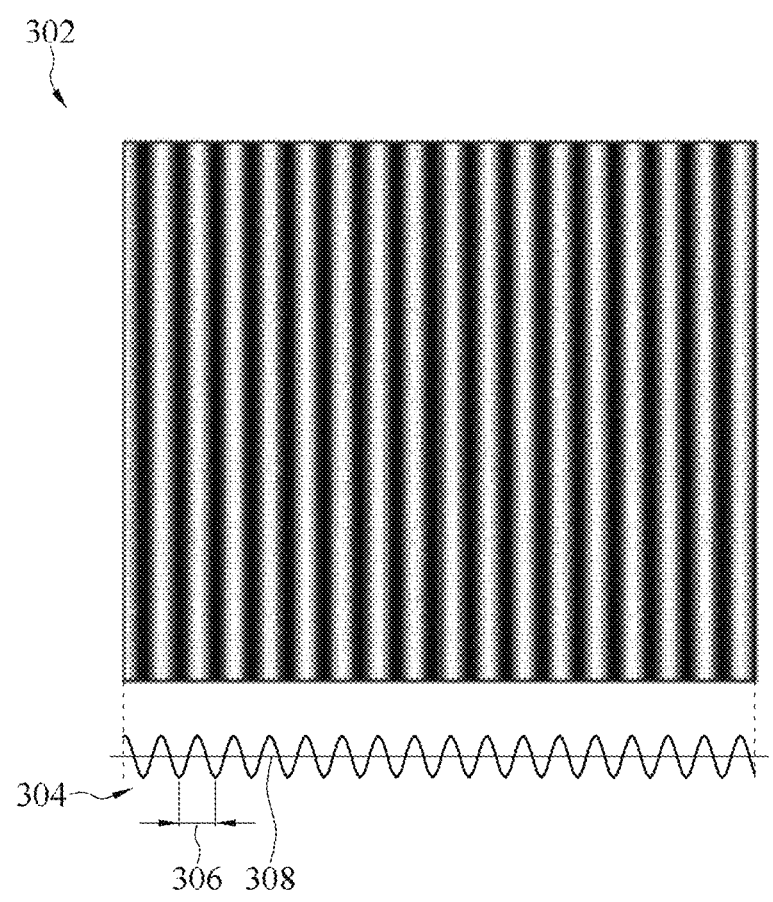
FIG. 2 is a schematic diagram of an embodiment of a structured light beam according to the present invention.

Referring to FIG. 2, FIG. 2 is a schematic diagram of an embodiment of a structured light beam 302 according to the present invention. According to some embodiments, a projection device 101 projects the structured light beam 302 on a scene 130. According to some embodiments, the structured light beam 302 has light intensity varying between light and dark according to a sinusoidal periodic function 304. According to some embodiments, a cycle 306 of the structured light beam 302 may be measured by pixels. According to some embodiments, a frequency is a reciprocal of the cycle 306.

According to some embodiments, each structured light beam 302 has a frequency, for example, but not limited to 0 cycle/mm, 1000 cycles/mm, and the like, and a mean level 308. According to some embodiments, the mean level 308 is a mean light intensity offset of a periodic function. According to some embodiments, each structured light beam 302 has the same mean level 308, that is, has the same mean light intensity offset.

Figure 3:
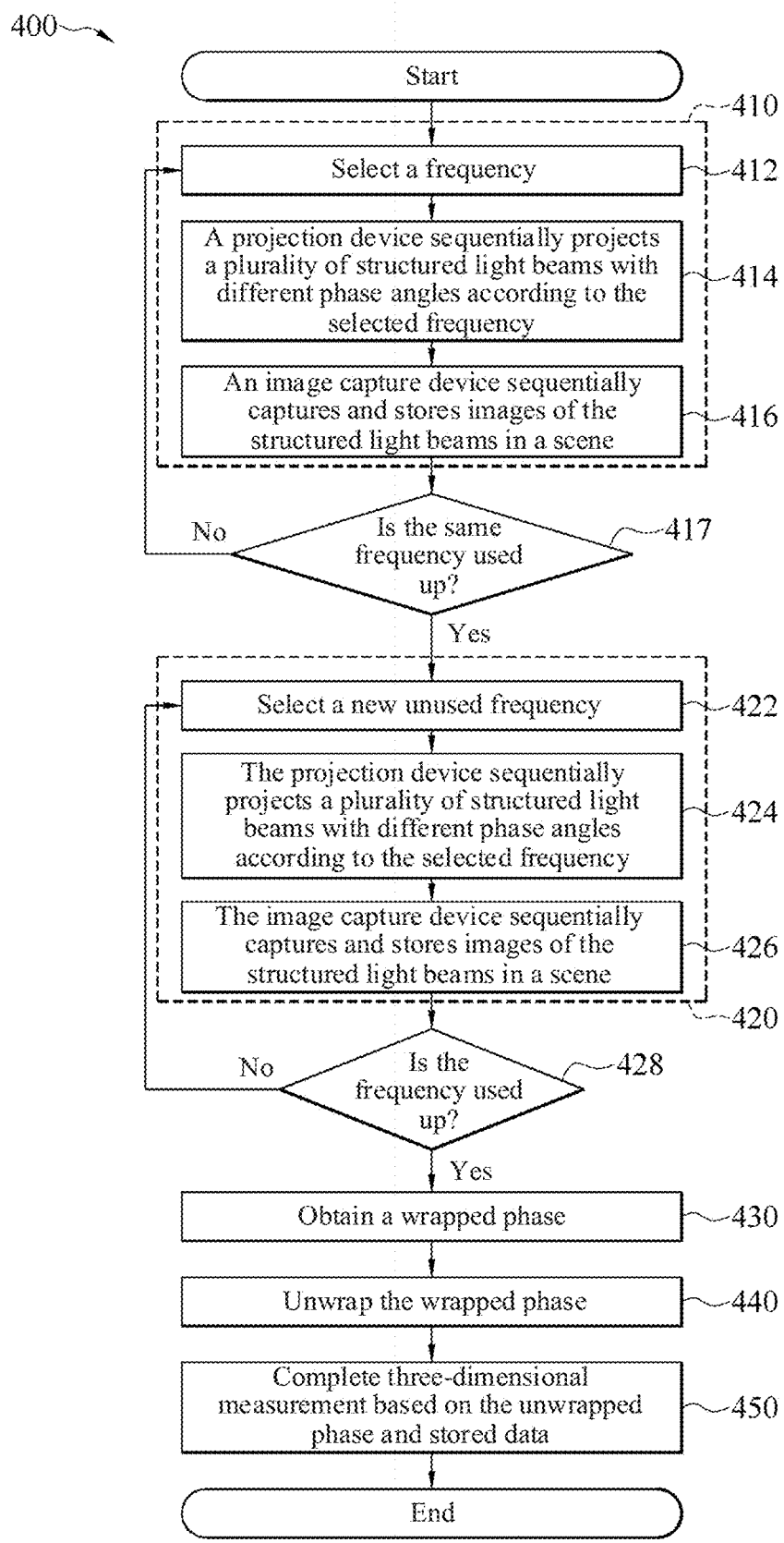
FIG. 3 is a flowchart of a first embodiment of a step for three-dimensional shape measurement according to the present invention.

Referring to FIG. 3, FIG. 3 is a flowchart of a first embodiment of a step 400 for three-dimensional shape measurement according to the present invention. According to some embodiments, a frequency group formed by a plurality of different frequencies required to perform step 400 is input to an image processing device 103, and then the image processing device 103 may cause a projection device 101 to project structured light beams 302 onto a scene 130 during a separate period of time according to a selected frequency. In some embodiments, the frequency group may include a plurality of identical frequencies and a plurality of different frequencies. The projection device 101 performs a first projection procedure 410 during a first projection period, and the first projection procedure 410 includes steps 412-416. In step 412, the image processing device 103 selects the frequency of the structured light beam 302 from the input frequency group. In step 414, the projection device 101 sequentially projects a plurality of structured light beams 302 with different phase angles onto the scene 130 according to the selected frequency. Then, in step 416, the image capture device 102 sequentially captures the image of the scene 130 within a first projection time of the structured light beams 302. Then step 417 is performed to determine whether the same frequency in the frequency group is used up, if yes, the second projection procedure 420 is performed, and if not, step 412 is performed to select the same frequency and repeat the subsequent steps.

Then, the projection device 101 performs a second projection procedure 420 during a second projection period, and the second projection procedure 420 includes steps 422-426. In step 422, the image processing device 103 selects an unused frequency of the structured light beam 302 from the input frequency group. In step 424, the projection device 101 sequentially projects a plurality of structured light beams 302 with different phase angles onto the scene 130 according to the selected frequency. Then, in step 426, the image capture device 102 sequentially captures the image of the scene 130 within a second projection time of the structured light beams 302. Then step 428 is then performed to determine whether the frequencies of the frequency group are used up, if not, step 422 is performed to select different frequencies and repeat the subsequent steps, and if yes, step 430 is performed to obtain a phase of the image. Such determining may be made in any suitable manner on any suitable basis. For example, in order to increase the measurement range, increase the resolution, and improve the problem of multi-value occurrence of a single frequency, a plurality of structured light beams 302 with different frequencies are used.

According to some embodiments, a plurality of structured light beams 302 with the same frequency and different phase shift angles form a group of structured light beams, so that a phase shift method is used to obtain the phase of the image subsequently, and a plurality of groups of structured light beams of different frequencies are used to solve the multi-value problem of a single frequency.

According to some embodiments, the structured light beams 302 during the first projection period and the structured light beams 302 during the second projection period have the same mean level 308 but have different frequencies. According to some embodiments, the plurality of structured light beams 302 during the first projection period are divided into one or more groups of structured light beams (or referred to as "a first group of structured light beams"), and each of the first group of structured light beams has the same frequency. According to some embodiments, the plurality of structured light beams 302 during the second projection period are divided into one or more groups of structured light beams (or referred to as "a second group of structured light beams"), and each of the second groups of structured light beams has different frequencies. According to some embodiments, the frequency of the first group of structured light beams is different from the frequency of any second group of structured light beams.

According to some embodiments, phase shift angles of each of the structured light beams 302 of the first group of structured light beams form an arithmetic progression, for example, 0, $$\frac{\pi}{2}, \frac{\pi}{2}, \text{ and } \frac{3\pi}{2},$$

respectively. Phase shift angles of each of the structured light beams 302 of the second group of structured light beams form an arithmetic progression, for example, 0, $$\frac{\pi}{2},$$

respectively. However, the present invention is not limited to the above examples, and the phase shift angles of the structured light beams 302 may be other angles.

Figure 4:
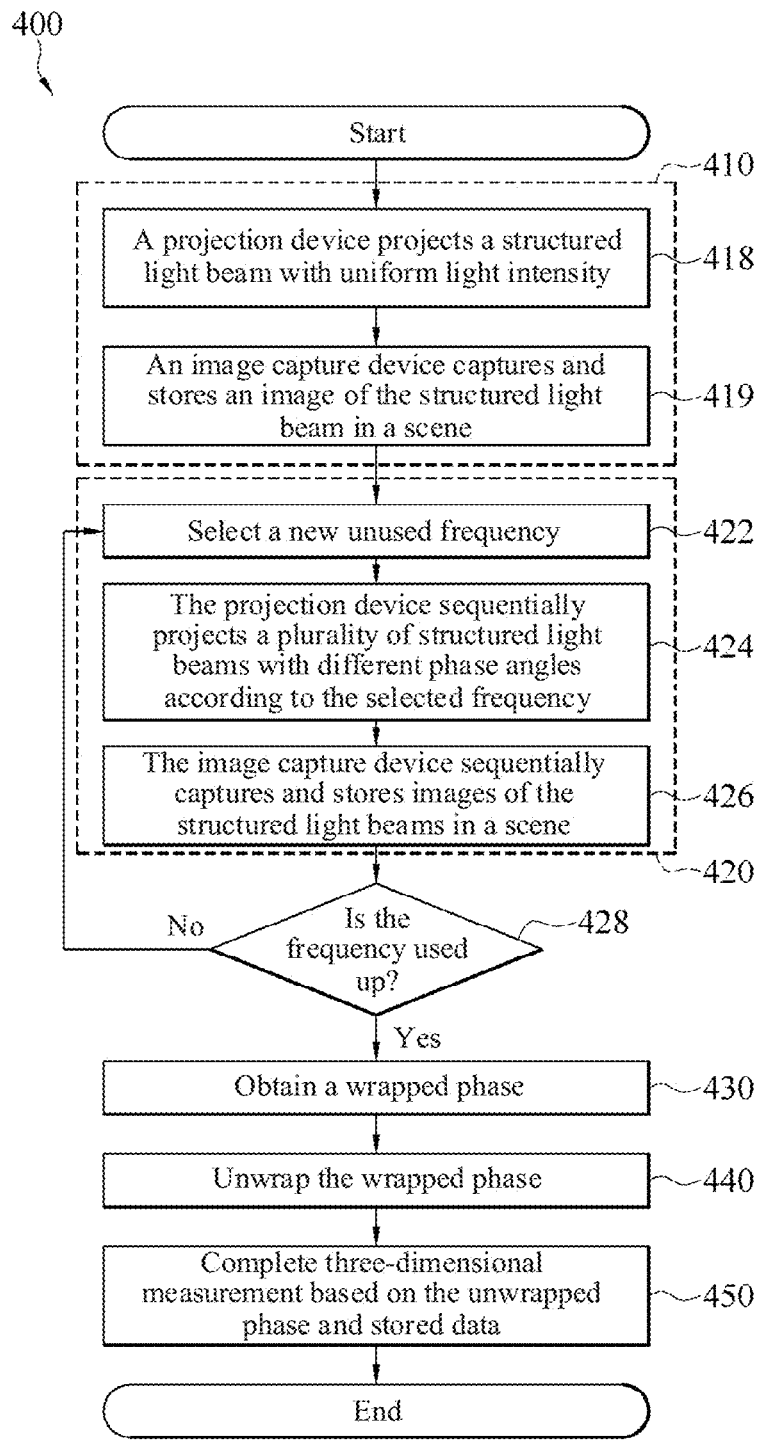
FIG. 4 is a flowchart of a second embodiment of a step for three-dimensional shape measurement according to the present invention.

Referring to FIG. 4, FIG. 4 is a flowchart of a second embodiment of a step 400 for three-dimensional shape measurement according to the present invention. According to some embodiments, a projection device 101 performs a first projection procedure 410 during a first projection period, and the first projection procedure 410 includes steps 418, 419. In step 418, the projection device 101 projects a structured light beam 302 of uniform light intensity corresponding to the mean level 308 onto a scene 130. Then, in step 419, an image capture device 102 captures an image of the scene 130 within the first projection time of the structured light beam 302, and continues to perform the second projection procedure 420 and perform subsequent steps during the second projection period.

According to some embodiments, in steps 416, 426, and 419 and in steps 414, 424, and 418, the image capture device 102 and the projection device 101 operate approximately synchronously. For example, but not limited to, a projection start time of the projection device 101 is slightly earlier than a capturing time of the imaging capture device 102, and a projection end time of the projection device 101 is slightly later than the capturing time of the image capture device 102; or the capturing time of the image capture device 102 is slightly earlier than the projection start time of the projection device 101, and a capturing end time of the image capture device 102 is slightly later than the end time of the projection device 101.

According to some embodiments, the second projection procedure 420 and step 428 may be reversed with the first projection procedure 410 and step 417, and in this embodiment, step 428 is to determine whether the frequency required for the second projection time in the frequency group is used up. For example, the second projection procedure 420 is performed first. In step 422, the image processing device 103 selects the unused frequency of the structured light beam 302 from the input frequency group, and then continues to perform the foregoing steps 424 and 426. When the image capture device 102 sequentially captures the image of the scene 130 within the second projection time of the structured light beam 302, and step 428 is performed to determine whether the frequency required for the second projection time in the frequency group is used up. If not, step 422 is performed to select a different frequency and repeat the subsequent steps, and if yes, the first projection procedure 410 continues to be performed. In step 412, the image processing device 103 selects the remaining frequencies in the frequency group, and then continues to perform steps 414 and 416. When the image capture device 102 sequentially captures the image of the scene 130 within the first projection time of the structured light beam 302, step 430 is performed to obtain a phase of the image. With steps of energy input/output, an optical system will gradually enter a stable state after a specified period of time. All devices are relatively unstable at the beginning of operation. Since the image captured by the first projection procedure 410 is a calculation basis of step 430, the stability of the calculation can be increased by reversing the sequence of the first projection procedure 410 and the second projection procedure 420. In some embodiments, after step 416 is performed, step 417 is performed to determine whether the frequency required by the first projection procedure is used up. If yes, step 430 is performed to obtain the phase of the image, and if not, step 412 is performed to select the remaining frequency and repeat the subsequent steps.

In step 430, the image obtained by the image capture device 102 during the first projection period is processed through the image processing device 103 to calculate the mean level value. According to some embodiments, the image processing device 103 uses the image obtained during the first projection period to calculate the phase in addition to the mean level value. Herein, the method of using the image of the first group of structured light beams to calculate the mean level value is described by taking the four-step phase shift as an example. But the present invention is not limited thereto, for example, a three-step phase shift may be used. Light intensity of each object point in each image may be expressed as Equation 1. The four-step phase shift method requires four images. The light intensity of object points respectively corresponding to the four images is shown in Equation 2 to Equation 5, where (x, y) represents a position of the object point, $I_0$ (x, y) represents the mean level value, B(x, y) represents an image amplitude, and $\emptyset_1$(x, y) represents an image phase. After the foregoing expression is finished, Equation 6 may be obtained. The mean level value may be obtained from, for example, but not limited to, Equation 7 to Equation 9.

$$I(x, y) = I_0(x, y) + B(x, y)\cos[\emptyset(x, y)] \quad \text{(Equation 1)}$$

$$I_1(x, y) = I_0(x, y) + B(x, y)\cos[\emptyset_1(x, y)] \quad \text{(Equation 2)}$$

$$I_2(x, y) = I_0(x, y) + B(x, y)\cos\left[\emptyset_1(x, y) + \frac{\pi}{2}\right] \quad \text{(Equation 3)}$$

$$I_3(x, y) = I_0(x, y) + B(x, y)\cos[\emptyset_1(x, y) + \pi] \quad \text{(Equation 4)}$$

$$I_4(x, y) = I_0(x, y) + B(x, y)\cos\left[\emptyset_1(x, y) + \frac{3\pi}{2}\right] \quad \text{(Equation 5)}$$

$$\emptyset_1(x, y) = \tan^{-1}\left(\frac{I_4(x, y) - I_2(x, y)}{I_1(x, y) - I_3(x, y)}\right) \quad \text{(Equation 6)}$$

$$I_0(x, y) = \frac{(I_1(x, y) + I_3(x, y))}{2} \quad \text{(Equation 7)}$$

$$I_0(x, y) = \frac{(I_2(x, y) + I_4(x, y))}{2} \quad \text{(Equation 8)}$$

$$I_0(x, y) = \frac{(I_1(x, y) + I_3(x, y) + I_2(x, y) + I_4(x, y))}{4} \quad \text{(Equation 9)}$$

In step 430, the image processing device 103 processes the mean level value obtained during the first projection period and the image obtained during the second projection period to calculate the phase. Since the mean level value has been obtained according to the images obtained during the first projection period, the number of parameters required for solution is reduced. Therefore, only at least two structured light beams 302 required to calculate the phase are needed, that is, only at least two images need to be captured. Moreover, according to some embodiments, there are two structured light beams 302 in each of the second groups of structured light beams, to reduce the number of captured images and increase the measurement rate. The phase calculation method, for example, but not limited to, a two-step phase shift method is used to obtain the phase. For example, the image of a second group of structured light beams is captured by performing the two-step phase shift method. Light intensity of each object point in each image may be expressed as Equation 10. The two-step phase shift method requires two images. The light intensity of the object points respectively corresponding to the second images is shown in Equation 11 to Equation 12, where (x, y) represents a position of the object point, $I_0(x, y)$ represents the mean level value, $B(x, y)$ represents an image amplitude, and $\emptyset_2(x, y)$ represents an image phase. After the foregoing expression is finished, Equation 13 may be obtained.

$$I(x, y) = I_0(x, y) + B(x, y)\cos[\emptyset(x, y)] \quad \text{(Equation 10)}$$

$$I_1(x, y) = I_0(x, y) + B(x, y)\cos[\emptyset_2(x, y)] \quad \text{(Equation 11)}$$

$$I_2(x, y) = I_0(x, y) + B(x, y)\cos[\emptyset_2(x, y) + \frac{\pi}{2}] \quad \text{(Equation 12)}$$

$$\emptyset_2(x, y) = \tan^{-1}\left[\left(\frac{I_1(x, y) - I_0(x, y)}{I_2(x, y) - I_0(x, y)}\right)\right] \quad \text{(Equation 13)}$$

According to some embodiments, two or more frequencies are used to measure a to-be-measured object 131 in a wide range, for example, a plurality of second groups of structured light beams are used. However, due to limitation of the modulation transfer function (MTF) characteristics of the lens, an amplitude of the projected and captured image varies with the frequency. In addition, the surface characteristics of different to-be-measured objects 131 are different, an amplitude of the image obtained by the image capture device 102 during the corresponding first projection period is different from an amplitude of the image obtained during the corresponding second projection period, and the amplitude of the image corresponding to the image capture device 102 between the different second groups of structured light beams is also different.

In step 440, since the phase obtained through step 430 is an arctangent function, a phase value of the arctangent function is wrapped in $$[-\frac{\pi}{2}, \frac{\pi}{2}],$$

which is referred to as a $\pi 0$ modulus. The continuous phase may be obtained by using, for example, but not limited to, the expansion method of Equation 14, where (x, y) represents the position of the object point, $\emptyset(x, y)$ represents a wrapped phase obtained in step 430, $\emptyset'(x, y)$ represents an unwrapped phase in step 440, and k is a constant.

$$\emptyset'(x,y) = \emptyset(x,y) + 2k\pi \quad \text{(Equation 14)}$$

According to some embodiments, since the first group of structured light beams and the plurality of second groups of structured light beams have different frequencies, a plurality of continuous phases of different frequencies may be obtained through step 430 and step 440. In particular, it should be noted that, due to the periodic characteristics of the periodic function, the phase obtained by using a single frequency is not necessarily a correct phase. For example, sin 60° and sin (2$\pi$+60°) have the same value, and a plurality of sets of different frequencies are needed for cross validation to obtain an accurate phase, thereby improving the resolution and accuracy of three-dimensional measurement.

In step 450, the continuous phase is obtained through step 440, and then a position of the object point on a surface of the to-be-measured object 131 in the scene 130 is calculated, by using a triangle geometric method, a phase of an object point of the structured light beam 302 projected by the projection device 101, and a phase of an object point of an image stored by the corresponding image capture device 102, to complete the three-dimensional shape measurement.

Based on the above, according to some embodiments, the apparatus for three-dimensional shape measurement in the present invention uses structured light beams of different frequencies to obtain the three-dimensional shape of the to-be-measured object through the image processing device. The structured light beams of different frequencies have the same mean level to reduce a number of captured images. An optical system has steps of energy input/output and needs to overcome the heat derivation problem. Therefore, by first projecting a low-frequency signal that is less affected by heat, and after the system gradually reaches thermal equilibrium and enters a steady state, a high-frequency signal or a signal with related mean levels is projected, thereby preventing the high-frequency signal from the influence of the system heat derivation. In addition, by using a plurality of frequencies to increase the measurement range, resolution, and accuracy, the multi-value problem caused by a single frequency is reduced.

What is claimed is:

1. An apparatus for three-dimensional shape measurement, comprising:
   a projection device configured to sequentially project a plurality of structured light beams on a scene during a first projection period and a second projection period, wherein each of the structured light beams is projected during a separate period of time and has a frequency and a mean level, the mean level of the structured light beams during the first projection period is the same as the mean level of the structured light beams during the second projection period, and the frequency of the structured light beams during the first projection period is different from the frequency of the structured light beams during the second projection period;

an image capture device configured to capture an image of the scene within the projection time of each of the structured light beams; and an image processing device configured to obtain a three-dimensional shape of a to-be-measured object in the scene according to the images, wherein the image processing device obtains a mean level value according to the images captured during the first projection period, obtains at least one phase according to the mean level value and the image captured during the second projection period, and obtains the three-dimensional shape of the to-be-measured object in the scene according to the phase.

2. The apparatus for three-dimensional shape measurement according to claim 1, wherein the structured light beams during the second projection period are divided into a plurality of second groups of structured light beams, the second groups of structured light beams respectively have different frequencies, and the images obtained by the image capture device corresponding to the different second groups of structured light beams have different amplitudes.

3. The apparatus for three-dimensional shape measurement according to claim 1, wherein an amplitude of the image obtained by the image capture device corresponding to the structured light beam during the first projection period is different from an amplitude of the image obtained by the image capture device corresponding to the structured light beam during the second projection period.

4. The apparatus for three-dimensional shape measurement according to claim 1, wherein the structured light beams during the first projection period are divided into at least one first group of structured light beams, the structured light beams during the second projection period are divided into at least one second group of structured light beams, the first groups of structured light beams have the same frequency, and the first groups of structured light beams and the at least one second group of structured light beams respectively have different frequencies.

5. The apparatus for three-dimensional shape measurement according to claim 1, wherein there is one structured light beam during the first projection period, the structured light beam is of uniform light intensity corresponding to the mean level, the structured light beams during the second projection period are divided into at least one second group of structured light beams, there are two structured light beams in each of the second groups of structured light beams, the two structured light beams have a periodically changing pattern, and each of the second groups of structured light beams has different frequencies.

6. The apparatus for three-dimensional shape measurement according to claim 1, wherein the structured light beams during the second projection period are divided into at least one second group of structured light beams, and there are two structured light beams in each of the second groups of structured light beams.

7. The apparatus for three-dimensional shape measurement according to claim 1, wherein the structured light beams during the first projection period are divided into at least one first group of structured light beams, and the structured light beams in the same first group of structured light beams have different phase shift angles.

8. The apparatus for three-dimensional shape measurement according to claim 7, wherein the phase shift angles form an arithmetic progression.

9. The apparatus for three-dimensional shape measurement according to claim 1, wherein the structured light beams during the second projection period are divided into at least one second group of structured light beams, and the structured light beams in the same second group of structured light beams have different phase shift angles.

10. The apparatus for three-dimensional shape measurement according to claim 9, wherein the phase shift angles form an arithmetic progression.

\* \* \* \* \*